F. W. KROGH.
OILING DEVICE FOR VERTICAL SHAFTS.
APPLICATION FILED DEC. 2, 1912.

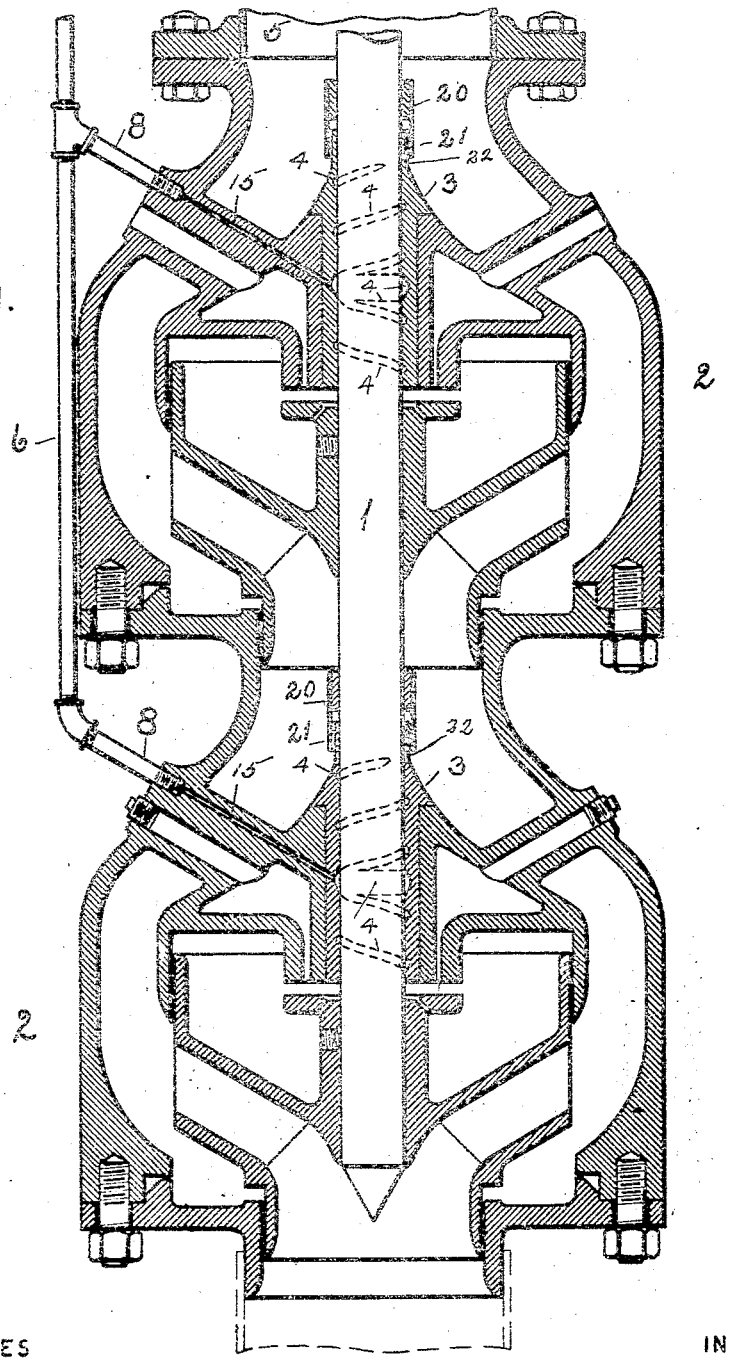

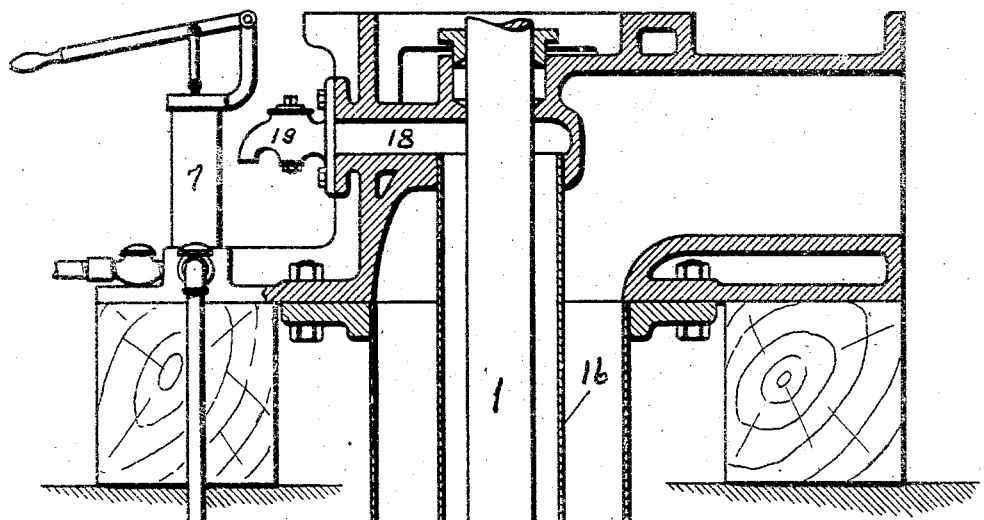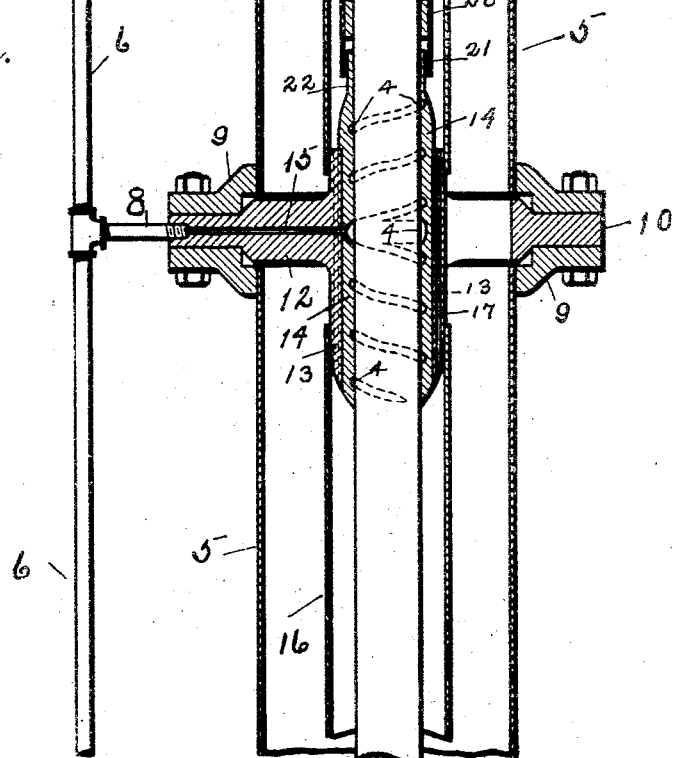

1,159,504.

Patented Nov. 9, 1915.
3 SHEETS—SHEET 3.

WITNESSES
O. Poulsen
Emily Wilder

INVENTOR
F. W. Krogh.
per A. S. Pare
ATTORNEY.

UNITED STATES PATENT OFFICE.

FERDINAND W. KROGH, OF SAN FRANCISCO, CALIFORNIA.

OILING DEVICE FOR VERTICAL SHAFTS.

1,159,504.  Specification of Letters Patent.  Patented Nov. 9, 1915.

Original application filed March 14, 1912, Serial No. 683,674. Divided and this application filed December 2, 1912. Serial No. 734,471.

*To all whom it may concern:*

Be it known that I, FERDINAND W. KROGH, of San Francisco, California, have invented certain new and useful Improvements in Oiling Devices for Vertical Shafts, whereof the following is a specification.

My invention relates to deep well pumps, and has for its objects to provide in devices of that class new and improved means for lubricating the shaft bearings thereof, and for saving the oil after it has been used for that purpose; and also new and improved means for protecting said bearings from grit and sand, the same being especially applicable to rotary pumps of the character set forth in my application for a United States Patent, numbered 683,674, filed March 14, 1912, deep well pumps, of which this is a divisional application.

With the above objects in view, my invention consists in one or more bearings located at suitable points along the shaft, having passages for conveying oil to the bearing surfaces, in combination with a rotary shaft supported in said bearings, and a pipe for carrying oil to said passages.

It also consists in a rotary shaft, one or more bearings located at suitable points along the shaft, supporting said shaft, having passages for conveying oil to the bearing surfaces, a pipe for carrying oil to said passages, and an oil pump for compressing oil or other lubricant into said passage.

It also consists in a rotary shaft, one or more bearings located at suitable points along said shaft, having passages for conveying oil to the bearing surfaces, a pipe for carrying oil to said passages, a shaft casing for causing water to convey the waste oil to the top, thereby saving same, and a cock for discharging the oil so conveyed.

It also consists in the combination with a rotary pump having novel means for protecting the bearing surfaces from grit and sand.

It also consists in the novel parts, combinations and arrangements set forth in the following description, particularly pointed out in the claims and illustrated in the accompanying three sheets of drawing, of which—

Figure 4:
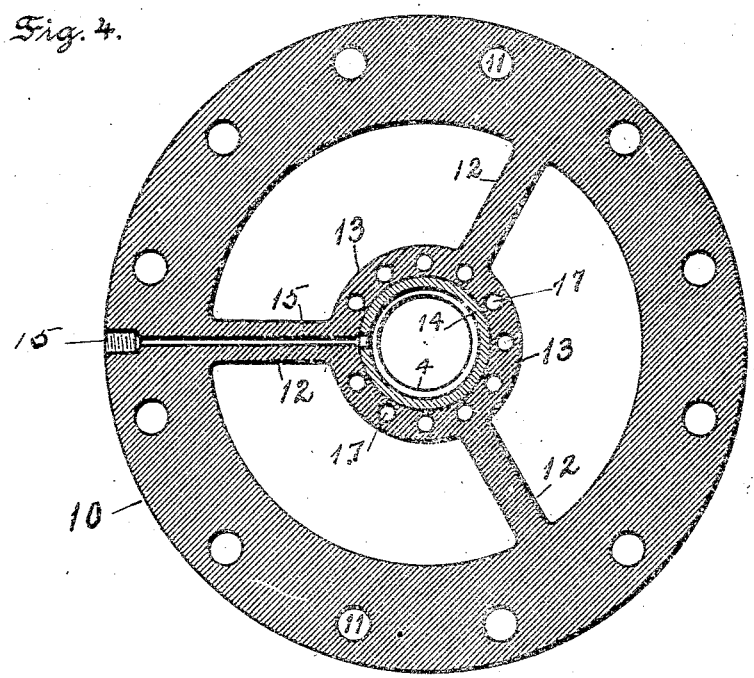
Figure 3:
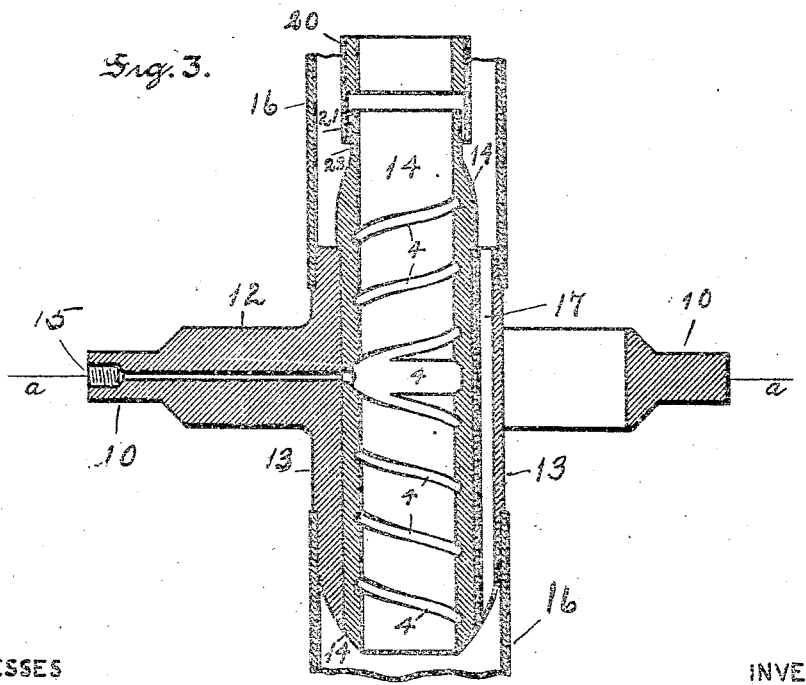

Figure 1 is a vertical, central sectional view of the pump mechanism at the bottom of a rotary pump plant for deep wells, showing the pump, oil pipe, channeled bearings, and adjacent parts; Fig. 2 is a similar view at and near the top of a rotary pumping plant, showing one of the intermediate bearings, the oil pipe, shaft, shaft casing, oil pump, and discharge device from the shaft casing; Fig. 3 is an enlarged vertical sectional view of the bearing shown in Fig. 2; and Fig. 4 is a horizontal sectional view of said bearing taken along lines a—a of Fig. 3.

The same symbol of reference marks the same part in whichever view said part may appear.

Describing now my invention in detail, and taking first the means for lubricating the bearings, 1 is a shaft and 2 rotary pumps located at the lower end thereof. Bearings 3 are located at suitable points along the well for supporting the shaft 1, and these are provided with passages 4 for conveying the oil to the bearing surfaces, and are supported by the pump casing 5. A pipe 6 in the well communicates with a source of oil supply, as the pump 7, and has extension pipes 8 leading to the oil passages 4 of the bearings 3. From the pump 7 the oil is conveyed through pipe 6 through extension pipes 8 to the bearing surfaces between the shaft 1 and the bearings 3, and compression on said pump will force the oil through said passages with whatever pressure may be desired.

Referring now to the bearings themselves, they consist of the supporting flanges 9 on the pump casing, to which the ring 10 is bolted, through the bolt holes 11. Radial arms 12 from ring 10 support the member 13, which carries the bushing 14, the surface of which engages the shaft 1. Through one or more of the arms 12 is a passage 15 which communicates at one end with the extension 8 of the oil pipe 6, and at the other end through member 13, to bushing 14 or bearing 3, where it branches into many parts and leads to the bearing surface of said bushing or bearing.

As to the means for saving the waste oil, the shaft casing 16 extends from the bottom to the top of the well, and is provided with inlets for the bearings above described. In the member 13 of said bearings are apertures 17 which allow water from leakage or otherwise to pass freely inside the shaft casing from the bottom to the top; and oil being lighter than water, as the waste oil passes from the bearing surfaces, it leaks into the water in shaft casing 16, passing through the apertures 17, and up through the water to the surface, whence it is drained off by the passage 18 and cock 19.

Considering now the novel means for protecting the bearings from grit and sand, I fix to the shaft 1 above each of the bearings a member 20, having a downwardly projecting ring 21. The bushing 14 and bearing 3 are contracted at their upper end into a ring 22, which extends upwardly into ring 21, and is covered thereby. Particles of sand and grit suspended in the water pass downwardly over member 20 and beyond the upper extremity of bushing 14, and through apertures 17, and so away from the bearing surfaces.

Having described my invention and believing I have produced novel and useful improvements in the art to which the same appertains, what I claim and desire to secure by United States Letters Patent is:—

1. In a device of the character specified, a rotary shaft, bearings located at suitable points along said shaft and adapted to support the same, annular grooves on said shaft opposite said bearings, passages in said bearings for conveying oil to said grooves and the bearing surfaces, a pipe for conveying oil to said passages, a pump for supplying oil or other lubricant under compression in said pipe, a casing located along said shaft adapted to receive waste oil and means in said casing for raising said waste oil to the top of said casing and discharging it therefrom.

2. In a device of the character specified, a rotary shaft, bearings located at suitable points along said shaft having passages for conveying oil to the bearing surfaces, a pipe for conveying oil to said passages, a casing around said shaft and connected to said bearings adapted to receive waste oil and means for raising said waste oil to the top of said casing and discharging it therefrom.

3. In a device of the character specified, bearings located at suitable points, having passages for conveying oil to the bearing surfaces, a pipe for conveying oil to said passages, and a shaft casing for inclosing a column of water adapted to raise the waste oil to the top.

4. In a device of the character specified, a rotary shaft, bearings located at suitable points along said shaft and supporting the same, having passages for conveying oil to the bearing surfaces, a pipe for conveying oil to said passages, a shaft casing adapted to be filled with water for raising the waste oil to the top, and a passage for discharging the waste oil.

5. In a device of the character specified, a rotary shaft, a bearing for said shaft, a passage connected to said bearing for conveying oil to the surface thereof, a pipe for conveying oil to said passage, and a casing around said shaft adapted to contain water to raise waste oil to the top thereof and to discharge said waste oil therefrom.

In testimony that I claim the foregoing I have hereto set my hand this 25 day of Nov., 1912, in the presence of witnesses.

FERDINAND W. KROGH.

Witnesses:
EMILY WILDER,
D. B. RICHARDS.